US009985968B2

(12) United States Patent
Tubi et al.

(10) Patent No.: US 9,985,968 B2
(45) Date of Patent: *May 29, 2018

(54) TECHNIQUES TO AUTHENTICATE A CLIENT TO A PROXY THROUGH A DOMAIN NAME SERVER INTERMEDIARY

(71) Applicant: Facebook, Inc., Menlo Park, CA (US)

(72) Inventors: Lior Tubi, Tel Aviv (IL); Dekel Shmuel Naar, Tel Aviv (IL); Gahl Saraf, Bat Hefer (IL); Guy Yonish, Raanana (IL); Roi Tiger, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/427,747

(22) Filed: Feb. 8, 2017

(65) Prior Publication Data
US 2017/0149781 A1    May 25, 2017

Related U.S. Application Data

(63) Continuation of application No. 14/548,024, filed on Nov. 19, 2014, now Pat. No. 9,602,468.

(51) Int. Cl.
*G06F 7/04* (2006.01)
*H04L 29/06* (2006.01)

(52) U.S. Cl.
CPC ...... *H04L 63/0884* (2013.01); *H04L 63/0281* (2013.01)

(58) Field of Classification Search
CPC .................................................. H04L 63/0884

USPC ............................................................ 726/7
See application file for complete search history.

(56) References Cited

U.S. PATENT DOCUMENTS

| 6,223,289 B1 * | 4/2001 | Wall ........................ G06F 21/31 |
| | | 709/227 |
| 6,961,783 B1 * | 11/2005 | Cook ................ H04L 29/12066 |
| | | 709/223 |
| 2003/0004834 A1 * | 1/2003 | Yamazaki .............. G06Q 20/02 |
| | | 705/26.1 |
| 2003/0115344 A1 * | 6/2003 | Tang ................... H04L 63/0272 |
| | | 709/229 |

* cited by examiner

*Primary Examiner* — Christopher Brown

(57) ABSTRACT

Techniques to authenticate a client to a proxy through a domain name server intermediary are described. In one embodiment, for example, a client apparatus may comprise a data store and a network access component. The data store may be operative to store a network configuration file, the network configuration file containing a client-specific secret. The network access component may be operative to transmit a communication request from the client device to a proxy server, the communication request directed to a destination server distinct from the proxy server, and to receive a response to the communication request from the destination server based on a determination by the proxy server that the client is authorized to use the proxy server, the determination based on the client having previously sent an encoding of a client-specific secret to a domain name server embedded within a lookup domain of a domain name request. Other embodiments are described and claimed.

20 Claims, 11 Drawing Sheets

TECHNIQUES TO AUTHENTICATE A CLIENT TO A PROXY THROUGH A DOMAIN NAME SERVER INTERMEDIARY

This application is a continuation of, claims the benefit of and priority to previously filed U.S. patent application Ser. No. 14/548,024 filed Nov. 19, 2014, entitled "TECHNIQUES TO AUTHENTICATE A CLIENT TO A PROXY THROUGH A DOMAIN NAME SERVER INTERMEDIARY," which is hereby incorporated by reference in its entirety.

BACKGROUND

In the operation of computer networks a proxy server may be used to function as an intermediary between two other computers. For example, a proxy server may function as an intermediary between a client and a second server, receiving a request from the client directed to the second server, transmitting the request to the second server, receiving a response to the request from the second server directed to the client, and transmitting the response to the client. In some cases a proxy server may specifically be a web proxy, dedicated or primarily used to act as an intermediary for web requests.

Network servers may allow for the authentication of clients. For instance, a virtual private network (VPN) server may authenticate clients to use the VPN. A virtual private network is an extension of a private network across a public network, such as the Internet, so as to allow the client access to functions of the private network.

Domain name servers may provide directory services for the domain namespace of the domain name system. A client may transmit a domain name request to a domain name server, the request comprising a domain name, and receive a numeric internet protocol (IP) address in response, the IP address corresponding to the domain name within the domain name directory.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to authenticate a client to a proxy through a domain name server intermediary. Some embodiments are particularly directed to techniques to use the authentication of a client to a virtual private network server to communicate to a domain name server that the client is authorized to use a proxy server, the domain name server acting as an intermediary to authenticate the client to the proxy.

In one embodiment, for example, a client apparatus may comprise a data store and a network access component. The data store may be operative to store a network configuration file, the network configuration file containing a client-specific secret. The network access component may be operative to transmit a communication request from the client device to a proxy server, the communication request directed to a destination server distinct from the proxy server, and to receive a response to the communication request from the destination server based on a determination by the proxy server that the client is authorized to use the proxy server, the determination based on the client having previously sent an encoding of a client-specific secret to a domain name server embedded within a lookup domain of a domain name request.

In another embodiment, for example, a server apparatus may comprise a network access component and an access control component. The network access component may be operative to receive a communication request from a client at a proxy server, the communication request directed to a destination server distinct from the proxy server, and to forward the communication request to the destination server based on a determination that the client is authorized to use the proxy server. The access control component may be operative to determine that the client is authorized to use the proxy server based on the client having previously sent an encoding of a client-specific secret to a domain name server embedded within a lookup domain of a domain name request.

In another embodiment, for example, a domain name server apparatus may comprise a network access component and an access control component. The network access component may be operative to receive a domain name request from a client, the request received at the domain name server, the domain name request comprising a domain name and to determine that a portion of the domain name corresponds to an verification sequence. The access control component may be operative to determine that the verification sequence that the client has access rights to the proxy server and to notify the proxy server that the client has access rights to the proxy server.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
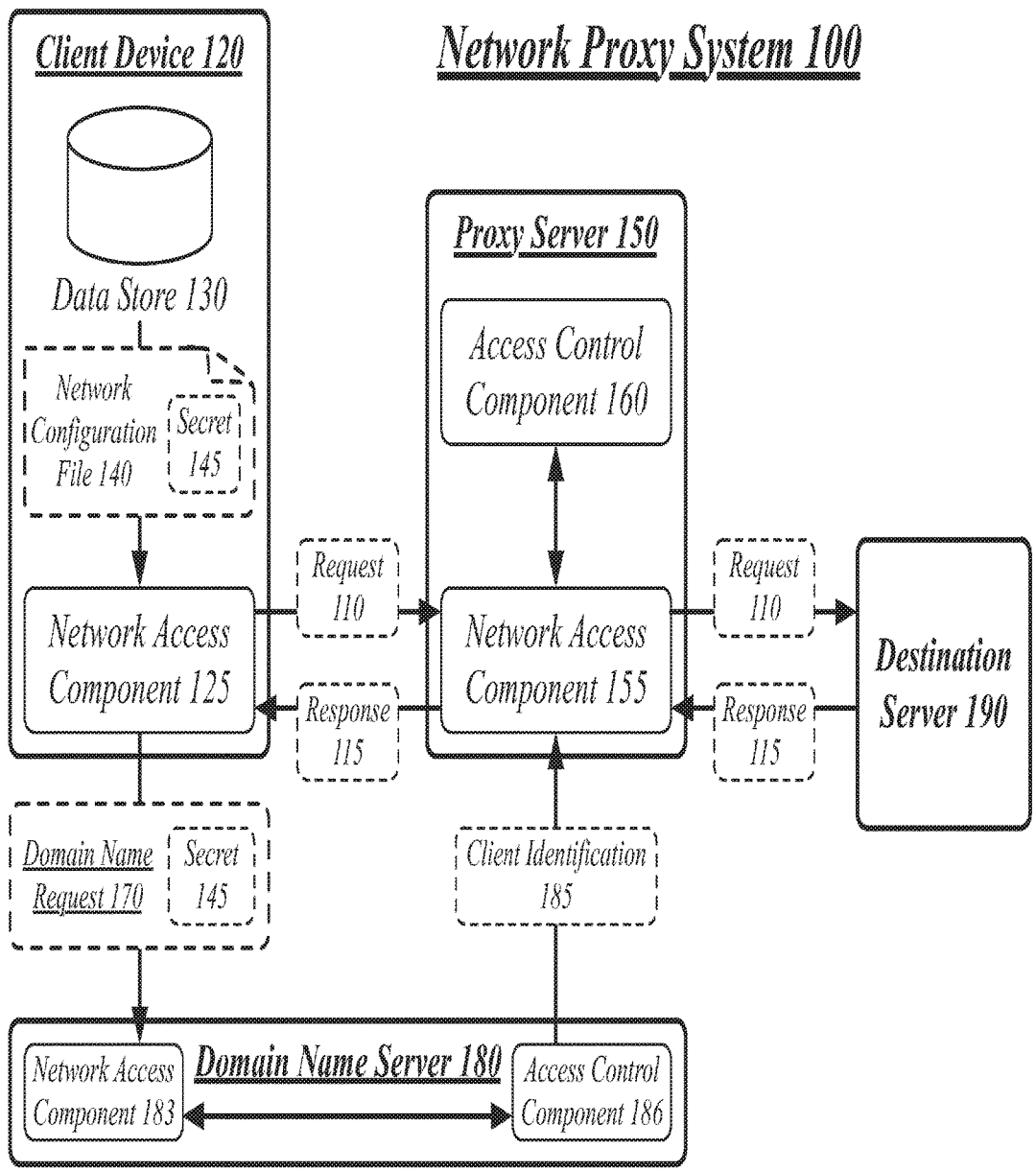
FIG. 1 illustrates an embodiment of a network proxy system.

Various embodiments are directed to techniques to whitelist a network address for a client at a proxy server by having the client indicate to a domain name server that a virtual private network server has authenticated the client. Some proxy servers use direct authentication of clients, in which a client directly authenticates with the proxy server to verify that the proxy server should accept its communication requests, forward them to destination servers, and forward any responses back to the client. However, not all client devices or client software supports proxy authentication. As such, a proxy server that serves these limited clients must either use an open proxy or must find another technique for restricting access. As open proxies allow for any client to use them, taking up network and processing resources of the proxy, leaving the proxy open is often an undesirable solution. In particular, where the providing of the proxy is am element of a business, leaving a proxy open is effectively giving away the product for free. As such, alternative techniques to direct proxy authentication may be desirable.

One such technique takes advantage of a client's ability to authenticate to separate server apart from the proxy server. For instance, a client may be capable of authentication to a VPN server but not capable of direct authentication to a proxy server, wherein direct authentication corresponds to the transmission of secret information authenticating the client being directly with the proxy server. The configuration of a client device to work with a VPN server may place one or more secrets on the client device, such as in a network configuration file. These secrets may then be used to communicate the client's authenticity to a server distinct from the VPN server, such as a domain name server. For instance, a client's interaction with a domain name server may embed the secret, possibly encrypted, within a domain name request. This secret being embedded in the domain name request may indicate to the domain name server that the client is one associated with the proxy service provided by the proxy server. The domain name server may therefore communicate to the proxy server that a network address, such as an IP address, associated with the domain name request should be whitelisted as being authorized to use the proxy server. In some cases, each authorized client may be assigned a particular port on a particular server, with the whitelisted network address therefore added to a list of network addresses from which incoming requests will be accepted. As a result, the embodiments can improve the security of a proxy server for its operator while extending use of the proxy server to clients incapable of direct authentication with the proxy.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a network proxy system 100. In one embodiment, the network proxy system 100 may comprise a computer-implemented system in which authentication of a client device 120 to a proxy server 150 includes the participation of a domain name server 180. Although the network proxy system 100 shown in FIG. 1 has a limited number of elements in a certain topology, it may be appreciated that the network proxy system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The client device 120 may comprise a data store 130 and a network access component 125. The client device 120 may be generally arranged to perform network communications through a network access component 125 that uses a network configuration file 140 to manage its operations. The data store 130 on the client device 120 may store the network configuration file 140. The network configuration file 140 may contain a client-specific secret 145. The secret 145 may have been assigned to the client device 120 during configuration or authentication with a separate server, wherein the possession of the secret 145 by the client device 120 indicates the authenticity of the client device 120.

The network access component 125 may be operative to transmit a communication request 110 from the client device 120 to a proxy server 150, the communication request 110 directed to a destination server 190 distinct from the proxy server 150. The network access component 125 may be operative to receive a response 115 to the communication request from the destination server 190 via the proxy server 150 based on a determination by the proxy server 150 that the client device 120 is authorized to use the proxy server 150. That this request is received from the destination server 190 implies that the request 110 was forwarded by the proxy server 150 to the destination server 190, with this forwarding of the request 110 to the destination server 190 also based on the determination by the proxy server 150 that the client device 120 is authorized to use the proxy server 150. It will be appreciated that the forwarding of the response 115 from the destination server 190 to the client device 120 is also based on the proxy server 150 receiving the response 115 from the destination server 190. The determination that the client device 120 is authorized to use the proxy server 150 may be based on the client device 120 having previously sent an encoding of a client-specific secret 145 to a domain name server 180 embedded within a lookup domain of a domain name request 170.

The network access component 125 may use the network configuration file 140 to determine how to handle network communications, and in particular how to respond to redirect requests, how to form domain name requests, and how to handle rejection of communication requests, such as may be received from a proxy server 150. The network configuration file 140 may comprise a plurality of rules. The network access component 125 may run the configuration file 140 on every network request made by the client device 120 and specifically on every web request made by the client device 120. One or more rules of the plurality of rules may relate to the handling of redirect requests. One or more rules of the plurality of the rules may relate to the handling of domain name requests. One or more rules of the plurality of rules may relate to the handling the rejection of communication requests.

The proxy server 150 may comprise an access control component 160 and a network access component 155. The network access component 155 may be operative to receive a communication request 110 from a client device 120 at a proxy server 150, the communication request 110 directed to a destination server 190 distinct from the proxy server 150. The network access component 155 may be operative to forward the communication request 110 to the destination server 190 based on a determination that the client device 120 is authorized to use the proxy server 150. The access control component 160 may be operative to determine that the client device 120 is authorized to use the proxy server 150 based on the client device 120 having previously sent an encoding of a client-specific secret 145 to a domain name server 180 embedded within a lookup domain of a domain name request 170.

The domain name server 180 may comprise a network access component 183 and an access control component 186. The network access component 183 may be operative to receive a domain name request 170 from a client device 120, the domain name request 170 comprising a domain name. The network access component 183 may be operative to determine that a portion of the domain name corresponds to an verification sequence. The access control component 186 may be operative to determine that the verification sequence indicates that a client device 120 has access rights to a proxy server 150 and therefore notify the proxy server 150 that the client device 120 has access rights to the proxy server 150. The access control component 186 of the domain name server 180 may notify the proxy server 150 by transmitting client identification 185 to the proxy server 185 using the network access component 183, the client identification 185 identifying the client device 120 to be allowed access to the proxy server 150.

In one embodiment, the access control component 186 may determine that the verification sequence indicates that a client device 120 has access rights to a proxy server 150 by decrypting at least a portion of the verification sequence and verifying that the decryption portion contains the client-specific secret 145. In other embodiments, the access control component 186 may determine that the verification sequence indicates that a client device 120 has access rights to a proxy server 150 by matching the verification sequence to an expected verification sequence received from the proxy server 150 that it was notified to watch for because the proxy server 150 had challenged a client device 120 that was attempting to use the proxy server 150 from a network address not on its list of authorized network addresses.

Figure 2:
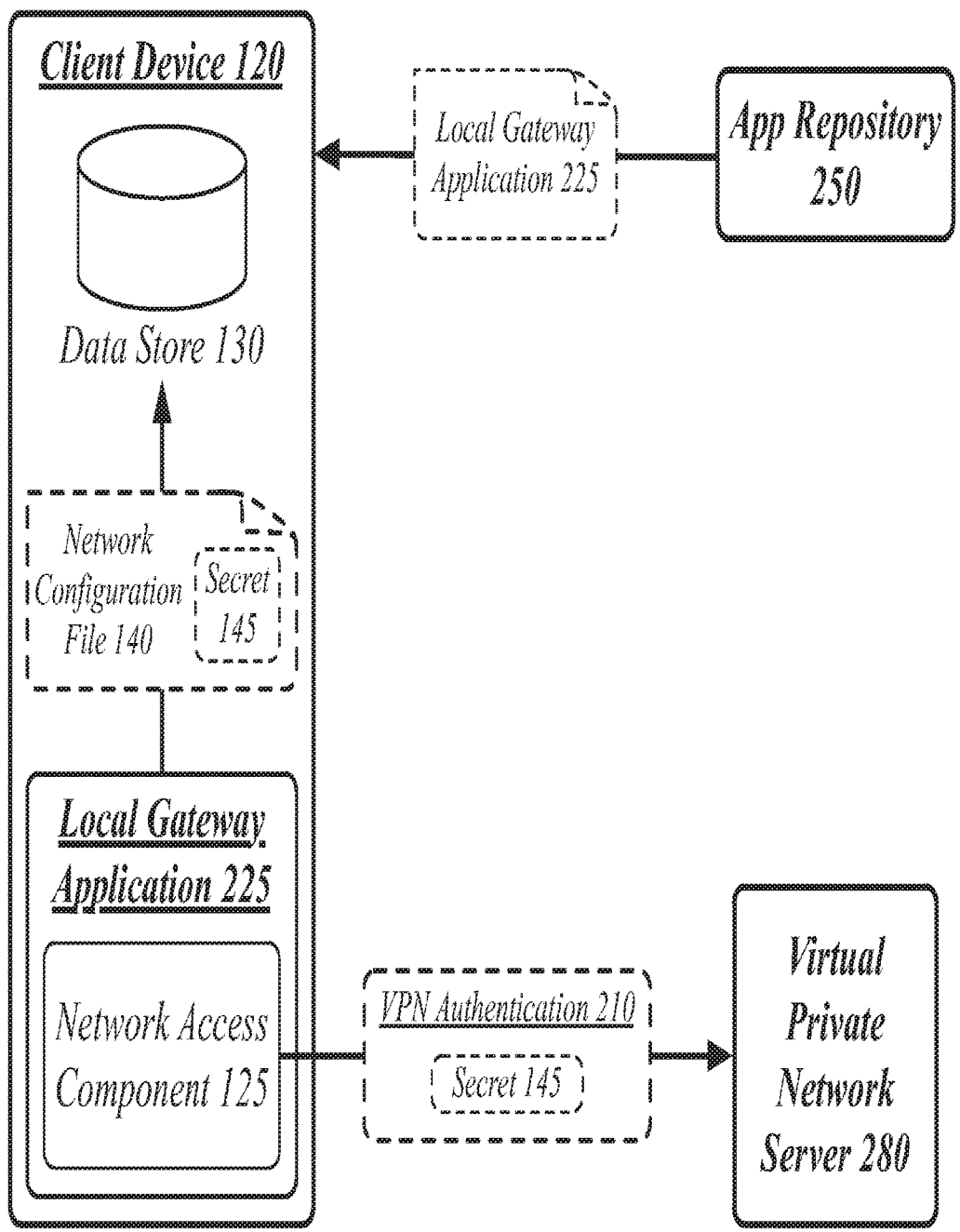
FIG. 2 illustrates an embodiment of the client device performing a VPN authentication.

FIG. 2 illustrates an embodiment of the network proxy system 100 in which the client device 120 performs a VPN authentication with a VPN server 280. As shown in FIG. 2, the client-specific secret 145 may be stored in a network configuration file 140 during configuration of a local gateway application 225 for use with the VPN server 280. The local gateway application 225 may comprise the network access component 125.

A local gateway application 225 may be received from an app repository 250. The app repository 250 may host a variety of mobile apps for use by various client devices. The app repository 250 may be associated with a provider of client device 120, a provider of an operating system of client device 120, or be a third-party app repository. The local gateway application 225 may be retrieved from the app repository 250 by request of a user of the client device 120. In other embodiments, the client device 120 may come preconfigured with the local gateway application 225.

The local gateway application 225 may empower the client device 120 to use a VPN server 280. The VPN server 280 may comprise a network-accessible server extending a private network across a public network such as the Internet. The VPN server 280 may be operative to allow the client device 120 to create a persistent encrypted connection to the VPN server 280 across which network traffic may be tunneled, with that network traffic exiting into a private network as if the client device 120 were directly networked to the private network.

The VPN server 280 may authenticate the client device 120 for access to the VPN according to any of the known techniques for client authentication. For example, the VPN server 280 may use a username and password combination to authenticate the client, the username and password communicated over an encrypted network link. This authentication to the VPN server 280 may be used to authenticate with the proxy server 150 without the communication with the proxy server 150 being carried over the VPN provided by the VPN server 280. This authentication of the client device 120 may be performed indirectly through a domain name server 180 rather than through direct communication with the proxy server 150. This may aid client devices, such as client device 120, incapable of directly authenticating to proxy servers.

The installation of local gateway application 225 may include the installation of network configuration file 140, including secret 145, with the client device 120, such as by storing the networking configuration file 140 in the data store 130. The network configuration file 140 may contain rules and other configuration information configuring the client device 120 to use the proxy server 150, domain name server 180, VPN server 280, and network proxy system 100 in general. The network configuration file 140 may include secret 145, the secret 145 specifically assigned to client device 120 such that it may be used by client device 120 in order to identify itself with the VPN server 280 and network proxy system 100. The secret 145 may comprise a client-specific string, client-specific number, or any other client-specific data. The secret 145 may be a unique secret for the client device 120 within the network proxy system 100. The secret 145 may be generated as a sufficiently lengthy string, number, or other data, including being randomly generated, such that the probability of two different clients receiving the same secret is highly unlikely. The secret 145 may be generated based on or including a timestamp, counter, or other non-repeating element so as to guarantee the uniqueness of the secret 145.

Client device 120 may transmit to VPN server 280 and VPN server 280 may receive from client device 120 a VPN authentication 210 authenticating the client device 120 with the VPN server 280. VPN authentication 210 may be specific to the client device 120 or to a user of client device 120, indicating, for example, the user's right to use the network proxy system 100. The VPN authentication 210 may include the transmission of secret 145 with the authentication information or as an integral part of integration the client device 120 with the VPN server 280. Upon receiving the VPN authentication 210, the VPN server 280 may transmit the current network address of the client device 120 to the proxy server 150 to notify the proxy server 150 of a valid network address for the client device 120. The VPN server 280, proxy server 150, and/or domain name server 180 may exchange the secret 145 empower the VPN server 280, proxy server 150, and domain name server 180 to jointly verify the identify of the client device 120 for authorization using the secret 145. The secret 145 may be exchanged in an encrypted format to avoid the secret 145 being revealed by eavesdropping on the connection. Any of the known techniques for obscuring secret information may be used in order to enhance the security of the network proxy system 100.

Figure 3:
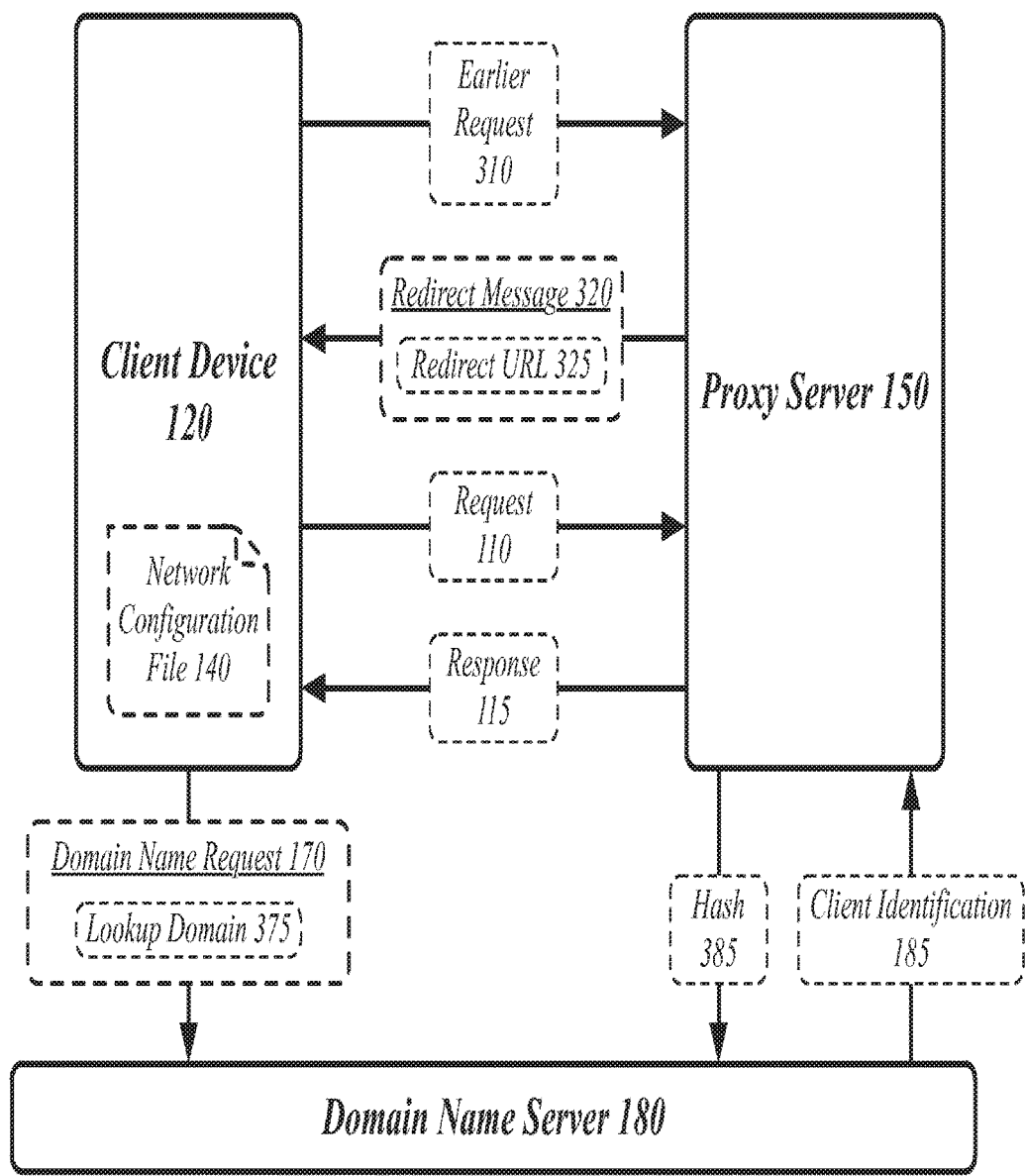
FIG. 3 illustrates an embodiment of the client device being redirected by the proxy server.

FIG. 3 illustrates an embodiment of the network proxy system 100 in which the client device 120 is redirected by the proxy server 150.

The domain name request 170 may have been initiated by a rule in the network configuration file 140 stored on the client device 120, the rule triggered by a challenge sent from the proxy server 150 to the client device 120. The challenge may have been received from the proxy server 150 by the client device 120 embedded within a redirect uniform resource locator (URL) 325 of a redirect message 320. The redirect message 320 may have been received in response to an earlier communication request 310 from the client device 120 to the proxy server 150. This earlier request 310 having caused this sequence of events may be the basis for the determination by the proxy server 150 that the client device 120 is authorized to use the proxy server 150.

The proxy server 150 may maintain a list of authorized network addresses. Client devices, such as client device 120, or users, such as a user of client device 120, may be each associated with a specific port on a proxy server of the network proxy system 100, such as proxy server 150. Network proxy system 100 may have a plurality of proxy servers, with proxy server 150 being one such server. In these cases, the proxy server 150 may maintain a list of authorized network addresses for a specific port on the proxy, the list of authorized network addresses being those addresses that are associated with the client device 120 or user associated with the client-specific port. The network addresses may be specifically IP addresses.

The proxy server 150 may have received the earlier request 310 from a client network address, where this client network addresses was not on the list of authorized network addresses, such as may have been specific to a client-specific port. The proxy server 150, having identified that the client network address is not on the list of authorized network addresses may have generated the redirect message 320 comprising the redirect URL 325 in order to challenge the client device 120.

The redirect URL 325 contains a domain name as part of the URL. This domain name may use a second-level domain and top-level domain corresponding to a maintainer of network proxy system 100. This domain name may use a third-level domain, second-level domain, and top-level domain corresponding to a maintainer of network proxy system 100. The top-level name may be, without limitation, a generic top-level domain or country-code top level domain. This domain name may use any one or more domain name suffixes that correspond to a maintainer of network proxy system 100. This domain name being one that corresponds to a maintainer of network proxy system 100 may serve to guarantee that domain name server 180, operated as part of network proxy system 100, is the ultimate registry for the domain name during domain name resolution. This domain name may be constructed in any way such that it will ultimately be resolved by the domain name server 180.

This domain name may have as a prefix a challenge string. This challenge string may be a static challenge string used by the network proxy system 100 for indicating a challenge, such as from a list of one or more static challenge strings. This challenge string may be a dynamic challenge string dynamically generated for each challenge. For instance, the challenge string may comprise a timestamp of the earlier request 110 or the generation of redirect message 320. The challenge string may comprise a concatenation of the timestamp with the client network address so as to ensure that the client device 120 may inform the domain name server 180 of its current network address as seen by the proxy server 150. For example, if the client device 120 connects to the Internet through a local proxy (such as may be integrated into a local router), the client device 120 may not know what network address is visible to Internet servers such as proxy server 150.

This redirect message 320 may therefore comprise a challenge to the client device 120 to prove its authority to use the network proxy system 100. Upon receiving any redirect message, including redirect message 320, the network access component 125 may use the network configuration file 140 to process the redirect. The use of the network configuration file 140 may be initiated by the reception of a redirect or may be initiated by the attempt to load the redirect. The network configuration file 140 may include a rule stating that if the domain name of any redirect URL contains a challenge string as part of the domain of that request that a domain name request will be performed with the domain name server 180, this domain name request 170 structured so as to authenticate the client device 120 and the client network address currently being used by the client device 120 with the network proxy system 100. That the domain name server 180 is used may be a natural consequence of the suffix for the domain name request corresponding to the domain name server 180 rather than an explicit indication in the network configuration file 140.

The rule may recognize that a redirect URL 325 has a suffix corresponding to the network proxy system 100 and a prefix matching the form of a concatenated timestamp and network address. This network address may be expressed purely as a number without the period delineations often used in the statement of an IP address. The timestamp may be constructed to be of a known length or format such that the timestamp portion and network address portion may be separated by the client device 120 or domain name server 180.

The network access component 125 may, based on the network configuration file 140, extract the redirect domain name from the redirect URL 235 and construct a lookup domain 375 by adding an additional prefix to the redirect domain. This additional prefix may be the authentication response by the client device 120 to the challenge. This additional prefix may be a hash 385 of the concatenation of the secret 145 and the challenge received from the proxy server 150. Because the hash 385 is built on the secret 145 the hash 385 is proof that the client device 120 performed the hashing. Because the hash 385 includes the challenge the hash 385 is proof that the authentication is in response to this particular challenge, preventing reuse by attackers. The network access component 125 may then perform a domain name request 170 using the lookup domain 375.

The proxy server 150 may communicate the expected hash 385 to the domain name server 180. Because the proxy server 150 knows the challenge that it is sending and the secret it can perform a duplicate hashing of their concatenation that will match the hashing performed on the client device 120. In this way, the domain name server 180 need never directly store the secret 145. In some embodiments the proxy server 150 may also transmit the challenge to the domain name server 180, as this may allow the domain name server 180 to precisely reconstruct the expected lookup domain 375. In some embodiments, the proxy server 150 may simply broadcast the expected lookup domain 375 to the domain name server. The domain name server 180 may then wait for a domain name request that contains the hash 385 or matches the lookup domain 375 and then inform the proxy server 150 of the successful client authentication using client identification 185.

Client identification 185 may inform the proxy server 150 that the client device 120 that uses a specific client-specific port on the proxy server 150 may use the client network address. Client identification 185 may inform the proxy server 150 that a user which uses a specific client-specific port on the proxy server 150 may use the client network address. Client identification 185 may generally configure the proxy server 150 to allow the user of client device 120 to use the network proxy system 100.

Figure 4:
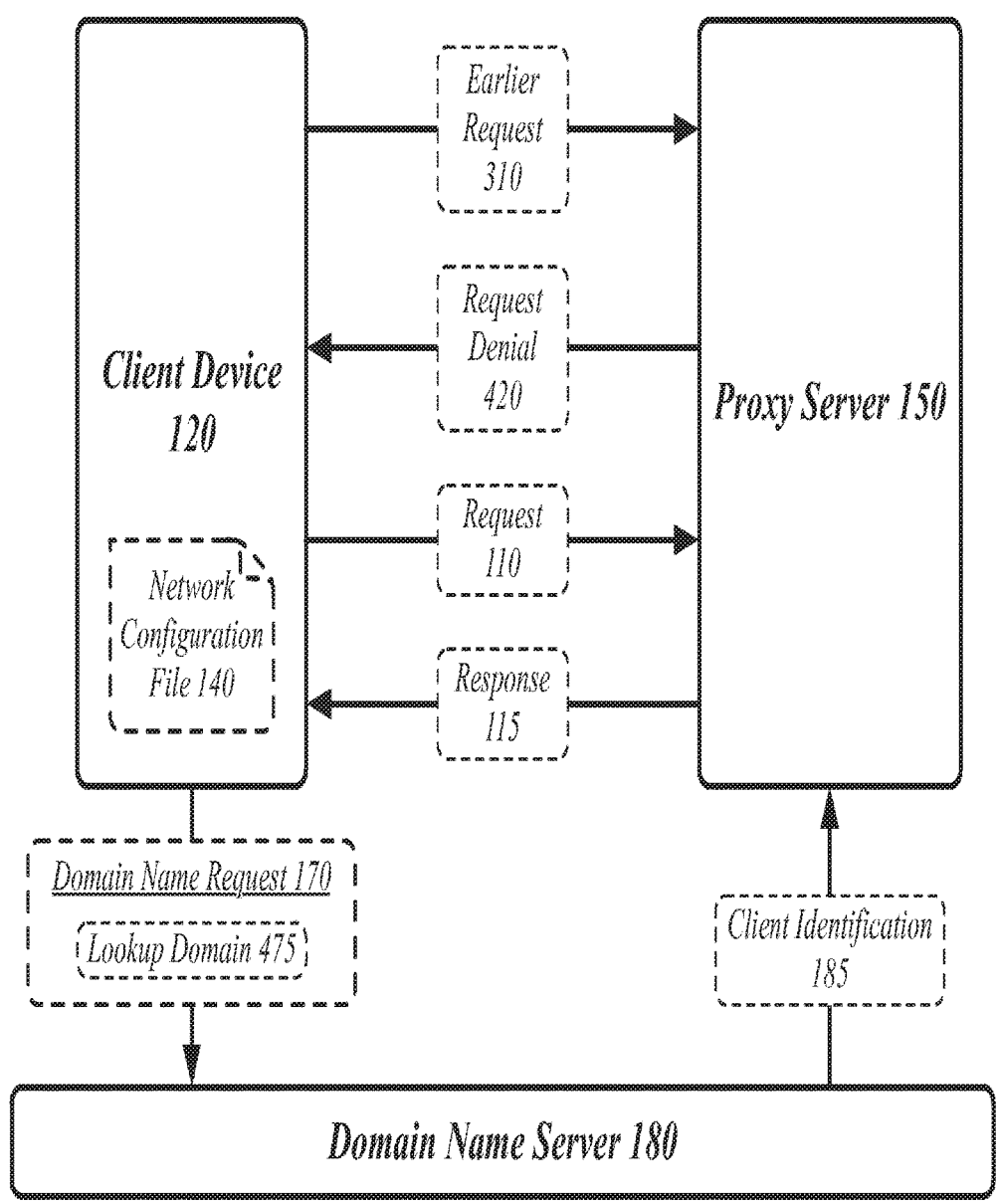
FIG. 4 illustrates an embodiment of the client device being denied a secure request.

FIG. 4 illustrates an embodiment of the network proxy system 100 in which the client device 120 is denied a communication request 110 by the proxy server 150.

The domain name request 170 may have been initiated by a rule in the network configuration file 140 stored on the client device 120, the rule triggered by an earlier request 310 being denied by the proxy server 150. The earlier request 310 may have been denied by the proxy server 150 in response to a determination by the proxy server 150 that the client network address was not on a list of authorized network addresses. The earlier request 310 may have been denied instead of redirected based on the proxy server 150 determining that the earlier request 310 used a protocol that prevents redirects by the proxy server 150. In some cases, the protocol may prevent redirects by the proxy server 150 through the use of encryption. For example, the earlier request 310 may have been a secure request where the proxy server 150, unable to fully emulate a destination server 190 due to not possessing the security certificates of the destination server 190, cannot send a redirect message as if were sent from the destination server 190. As such, it may be the encryption used in the transmission of earlier request 310 and any response to the request by the destination server 190 that prevents redirects by the proxy server 150. In some cases, a secure request may comprise a Hypertext Transfer Protocol Secure (HTTPS) request.

Because the challenge is transmitted to the client device 120 by the proxy server 150 within the domain name of a redirect URL 325 of a redirect message 320, if the earlier request 310 prevents or otherwise does not support redirects, then no redirect message 320 may be sent and therefore no challenge embedded within the redirect domain name of a redirect URL 325. The client device 120 may be sent a request denial 420 in response to the earlier request 310. The request denial 420 may correspond to an "HTTP bad request" message. Alternatively, while a request denial 420 may occur, this request denial 420 may simply be a failure of the client device 120 to generate a connection, such as a transmission control protocol/internet protocol (TCP/IP) connection, which may not allow for the embedding of additional data like a challenge. Therefore, the network configuration file 140 may include a rule that if a connection to the proxy server 150 is denied that the client device 120 should perform a domain-name request 170 using a specially-formatted lookup domain 475 attempting to authenticate the client device 120 for use of the network proxy system 100.

As the client device 120 has not received a challenge from the proxy server 150, no challenge may be included in the lookup domain 475 by the client device 120. As the challenge is how the client device 120 learned what its network address was as visible to the proxy server 150, the network address that should be added to the list of authorized network addresses may not be available to transmit to the domain name server 180. While other techniques may exist for the client device 120 to determine its externally-visible network address, these techniques may not be available for use in the construction of a lookup domain 475 by the network configuration file 140. Further, the domain name server 180 may not receive the domain name request 170 directly from the client device but instead through an intermediary domain name server. The client device 120 will typically be configured to perform its domain name requests with a domain name server local to the network through which it is accessing the Internet, as may be provided by an internet service provider (ISP) or cellular data provider for a mobile device. Instead, the local domain name server for the client device 120 will perform the domain name request 170 with the domain name server 180, or the domain name request 170 may even be performed through additional intermediary domain name servers. This is why the lookup domain 475 is set to be a domain name whose suffix is associated with the domain name server 180, why the hash and challenge are unique (to force a new domain name resolution rather than the resolution hitting a cached response on an intermediary), and why any data about the client device 120 must be sent in an encrypted or otherwise obscured format. As such, the domain name server 180 cannot assume that the incoming network address from which it receives the domain name request 170 corresponds to the client device 120.

Therefore the network proxy system 100 empowers a client device 120 to temporarily open its client-specific port on its assigned proxy server 150 to incoming traffic from any client device. Where the first communication request from a client device 120 to a proxy server 150 is from a network address not previously used by that client device 120 and that first communication request from that network address uses a communication protocol preventing redirects, for that first communication request to function the client-specific port must be opened to all traffic. The proxy server 150 will then watch all incoming requests on that client-specific port and whenever one arrives from a network address not on the list of authorized network addresses that does allow for redirects, the redirect technique will be used to attempt to authorize that network address for adding to the list. As such, while the client-specific port may only open to any incoming network address, it may only be open to incoming network addresses not on the list of authorized network addresses when those incoming network addresses use protocols that prevent redirects.

The network configuration file 140 may contain a rule that is triggered when a request denial 420, such as an "HTTP bad request" message, is received. The rule may indicate that a domain name request 170 with a lookup domain 475 should be performed. The lookup domain 475 may be constructed to inform the domain name server 180, and therefore the proxy server 150, which port on which proxy server should be opened, with the secret 145 included in a hashed (e.g., encrypted) format in order for the client device 120 to verify that it has the authority to request that that specific port on that specific proxy server be opened.

The lookup domain 475 may use a second-level domain and top-level domain corresponding to a maintainer of network proxy system 100. The lookup domain 475 may use a third-level domain, second-level domain, and top-level domain corresponding to a maintainer of network proxy system 100. The suffix for the lookup domain 475 may generally be any one or more domain name suffixes that correspond to a maintainer of network proxy system 100. The lookup domain 475 being one that corresponds to a maintainer of network proxy system 100 may serve to guarantee that domain name server 180, operated as part of network proxy system 100, is the ultimate registry for the domain name during domain name resolution. The lookup domain 475 may be constructed in any way such that it will ultimately be resolved by the domain name server 180.

The lookup domain 475 may use a sequence of delineated prefix segments that contain a hash of the secret 145, the client-specific port on the proxy server 150, and an identifier for the proxy server 150. The identifier for the proxy server 150 may be a network address for the proxy server 150, an internal-defined number for the proxy server 150 assigned by the network proxy system 100, or any other identifier that uniquely identifies proxy server 150 among the plurality of proxy servers that may be used by the network proxy system 100. Where the client device 120 may be allowed to use multiple proxy servers—for example, to allow for fail-over or downtime for proxy servers—multiple identifiers may be used, multiple identifiers and ports may be used, and identifiers which indicate multiple proxy servers may be used. These prefixes may be extracted from the lookup domain 475 by the domain name server 180 and transmitted to the proxy server 150 as client identification 185. In some embodiments the client secret 145 may be verified by the domain name server 180. In other embodiments the client secret 145 may be verified by the proxy server 150.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
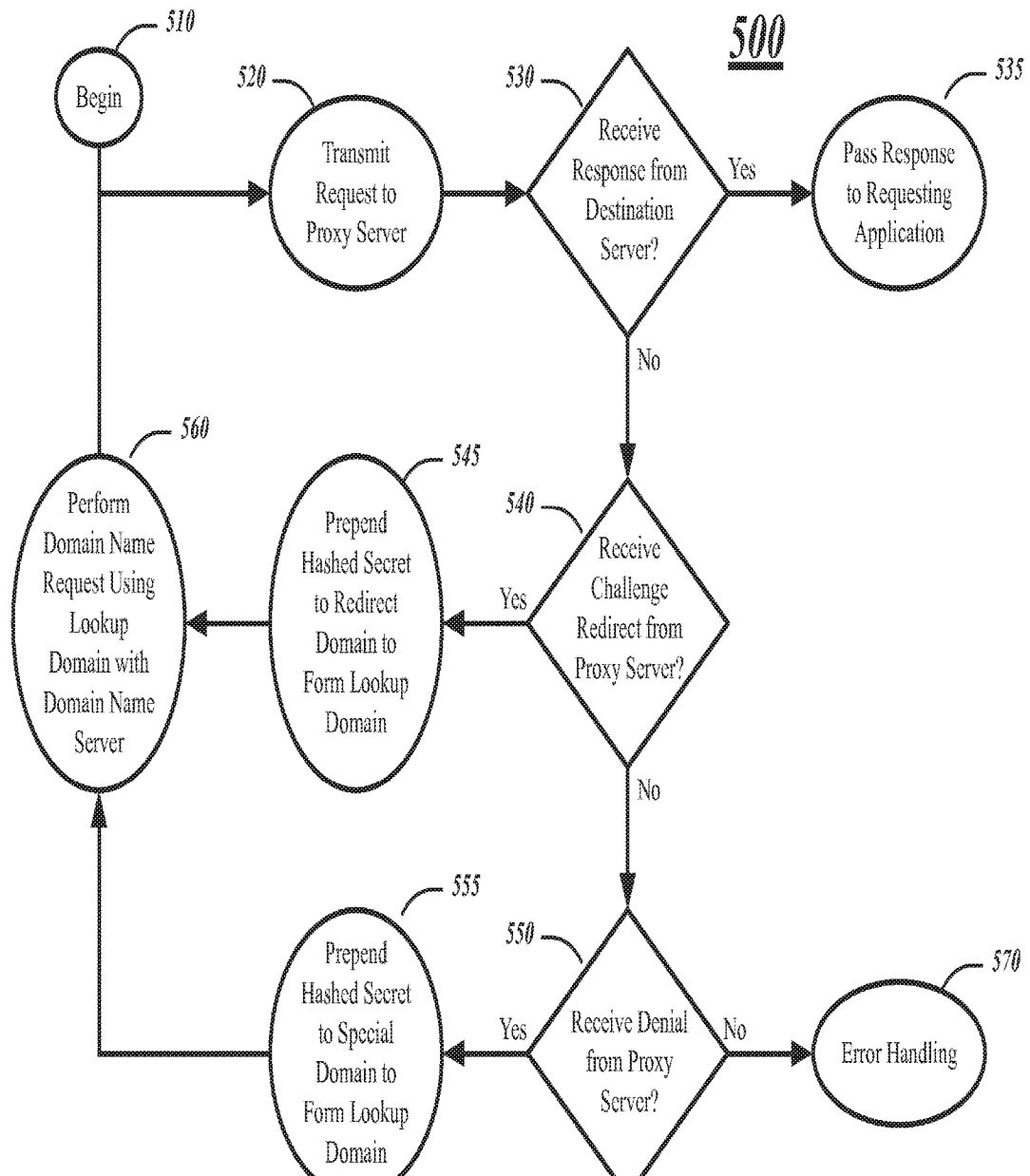
FIG. 5 illustrates a client-side logic flow for the network proxy system of FIG. 1.

FIG. 5 illustrates one embodiment of a client-side logic flow 500. The logic flow 500 may be representative of some or all of the operations executed by one or more embodiments described herein.

In the illustrated embodiment shown in FIG. 5, the logic flow 500 may begin at block 510. This may correspond to the reception of a communication request 110 from an application, such as a user application, on the client. For instance, a user may run a web browser on the client and use the web browser to request a web page, the web page hosted by a web server on the destination server 190. The logic flow 500 may then proceed to block 520.

The logic flow 500 may transmit a request 110 to proxy server 150 at block 520. This request 110 may ultimately be intended for destination server 190, with the request 110 transmitted to the proxy server 150 as a request for forwarding to the proxy server 150. The determination to transmit the request 110 to proxy server 150 may have been determined by the network access component 125 based on network configuration file 140. The logic flow 500 may then proceed to block 530.

The logic flow 500 may branch on whether a response 115 from the destination server is received at block 530. The client may receive a response to its request 110 and determine whether it is a response 115 from the destination server 190. If the client receives a response 115 from the destination server 190 then it has no need to authenticate itself with the proxy server 150 as it has, presumably, already been authenticated at its current network address. If a response 115 is received from the destination server 190, then the logic flow 500 may proceed to block 535 Otherwise, the logic flow 500 may proceed to block 540.

The logic flow 500 may branch on whether a challenge redirect is received from the proxy server 150 at block 540. The client may receive a response to its request 110 and determine whether that response is a challenge redirect. A challenge redirect may be a redirect message 520 wherein the redirect URL 325 contains a challenge string as a prefix. If a challenge redirect has been received, then the logic flow 500 may proceed to block 545. If a challenge redirect has not been received the logic flow may proceed to block 550.

The logic flow 500 may branch on whether a request denial 420 is received from the proxy server 150 at block 550. The client may receive a response to its request 110 and determine whether that response is a request denial 420. A request denial 420 may comprise an "HTTP bad request" message. If a request denial 420 has been received, then the logic flow 500 may proceed to block 555. Otherwise, the logic flow 500 may proceed to block 570.

It will be appreciated that in some embodiments the branching path controlled by blocks 530, 540, and 550 may be evaluated in a different order than as presented in FIG. 5. In some embodiments, the branching path controlled by blocks 530, 540, and 550 may be embodied in the network configuration file 140, with each block corresponding to a rule in the network configuration file 140 and the affirmative branch off each block corresponding to the consequence of each respective rule being triggered.

The logic flow 500 may pass the response 115 to the requesting application at block 535. For example, if the request 110 is an HTTP request for a webpage from a web server on destination server 190, then the response 115 may comprise an HTTP response containing the requested webpage. The logic flow 500 may then complete, the network access component 125 waiting for another request from the same or a different application.

The logic flow 500 may prepend the hashed secret to the redirect domain to form lookup domain 375 at block 545. The hashed secret may be a hash of secret 145 according to a known hashing or encryption scheme. The hashed secret may include additional information, such as the challenge from the redirect domain and/or an identifier for the proxy server 150 and the client-specific port on the proxy server 150. The logic flow 500 may then proceed to block 560.

The logic flow 500 may prepend the hashed secret to a special domain to form lookup domain 475 at block 555. The hashed secret may be a hash of secret 145 according to a known hashing or encryption scheme. The hashed secret may include additional information, such as a timestamp and/or an identifier for the proxy server 150 and the client-specific port on the proxy server 150. The special domain may be stored in the network configuration file 140 and correspond to a domain for the network proxy system 100. The logic flow 500 may then proceed to block 560.

The logic flow 500 may perform a domain name request 170 using the lookup domain 375 or 475 with the domain name server 180 at block 560. The client may not directly transmit the domain name request 170 to the domain name server 180, but may instead directly transmit the domain name request 170 to a local domain name server. For instance, the client may use the dynamic host configuration protocol (DHCP) which specifies a domain name server for use by the client. The client may use any of the known techniques for determining its immediate domain name server. The client may transmit the domain name request 170 to that immediate domain name server with the domain name request 170 eventually ending up at the domain name server 180 directly from the immediate domain name server or through one or more intermediary domain name servers as the domain name request 170 works its way through the DNS hierarchy. The logic flow 500 may then proceed to block 520. As block 520 includes retransmitting the request 110 to the proxy server 150 this retransmission may be sent to an IP address received from the domain name server 180 in response to the domain name request 170, this IP address corresponding to the proxy server 150.

The logic flow 500 may perform error handling at block 570. This may include comparing a received response to request 110 to other rules of the network configuration file 140, may include reporting a communication failure to the requesting application, may include attempting to send the request 110 directly to the destination server 190 without using the proxy server 150 as an intermediary, or any other known technique for handling communication requests.

The embodiments are not limited to this example.

Figure 6:
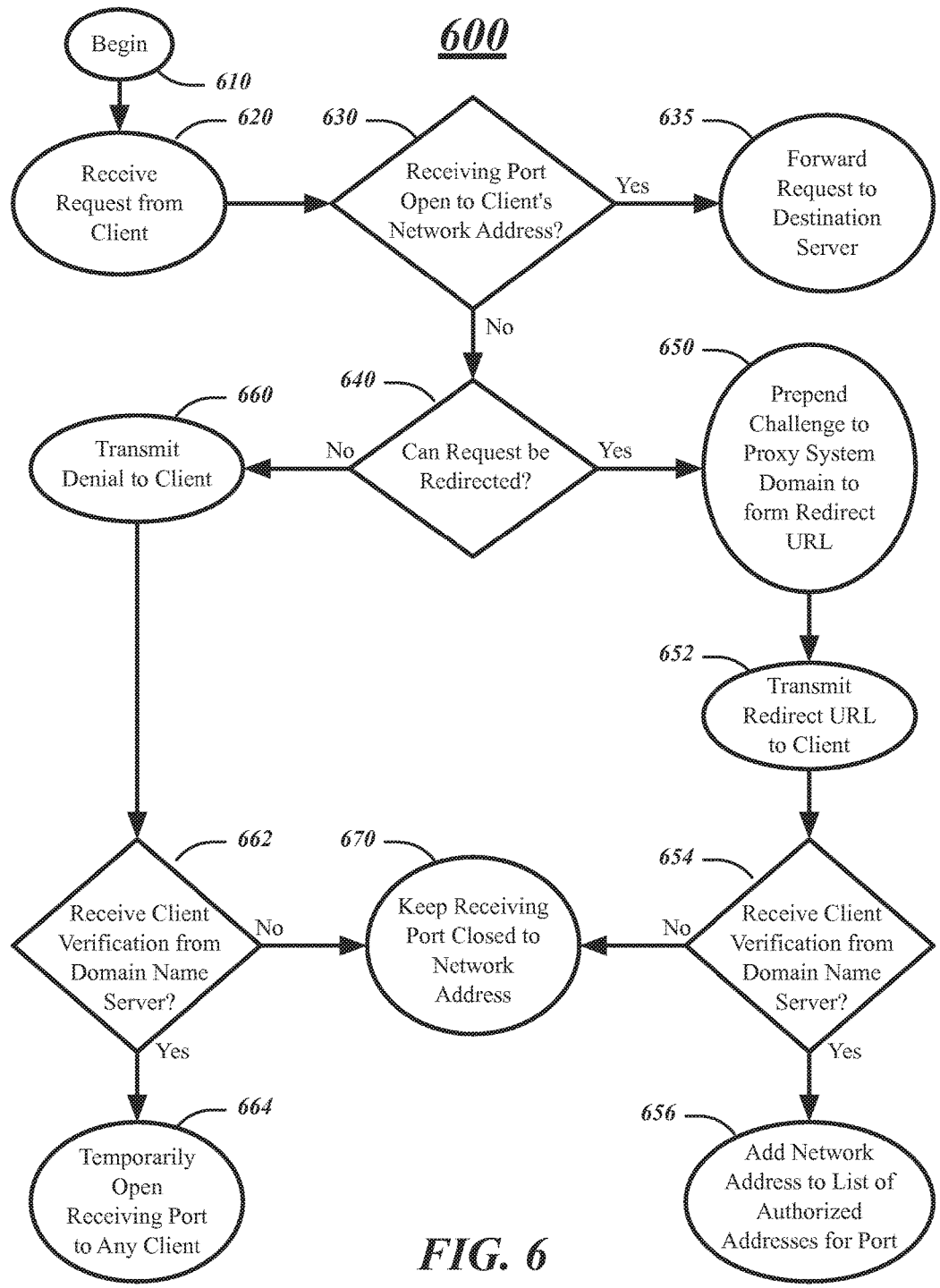
FIG. 6 illustrates a proxy-server-side logic flow for the network proxy system of FIG. 1.

FIG. 6 illustrates one embodiment of a server-side logic flow 600. The logic flow 600 may be representative of some or all of the operations executed by one or more embodiments described herein.

In the illustrated embodiment shown in FIG. 6, the logic flow 600 may begin at block 610. This may correspond to an incoming connection being received on a network port on the proxy server 150. The logic flow 600 may then proceed to block 620.

The logic flow 600 may receive a request 110 from a client at block 620. The request 110 may comprise a web request, such as an HTTP or HTTPS request, directed to a web server on a destination server 190. The logic flow 600 may then proceed to block 630.

The logic flow 600 may determine whether the receiving port is open to the client's network address at block 630. The ports on proxy server 150 may be client-specific in that each one is assigned to a particular client. Each client may be associated with a list of authorized network addresses for that client, with each port therefore being open to incoming requests from any of those authorized network addresses. In some cases, a port may be temporarily open to non-redirectable requests from any network addresses, in which case the receiving port would be open to the client's network address for any address if the received request 110 cannot be redirected by the proxy server 150. If the receiving port is open to the incoming network address, then the logic flow 600 may proceed to block 635. Otherwise, the logic flow 600 may proceed to block 640.

The logic flow 600 may forward the request 110 to the destination server 190 at block 635. With the receiving port open to the client's network address, the proxy server 150 may simply perform its primary function as intended. The logic flow 600 may then end, with the proxy server 150 waiting to receive a response 115 from the destination server 190 for forwarding to the client, waiting for additional requests from the client, and performing any other tasks asked of it in the functioning of network proxy system 100, such as handling communication from and to other clients.

The logic flow 600 may determine whether the request 110 can be redirected at block 640. The determination of whether the request 110 can be redirected may be based on the communication protocol of the request 110, the encoding of the request 110, or any other criteria. If the request 110 can be redirected, then the logic flow 600 may proceed to block 650. Otherwise, the logic flow 600 may proceed to block 660.

The logic flow 600 may prepend a challenge to the proxy system domain to form redirect URL 325 at block 650. The proxy system domain may be the domain name for the network proxy system 100. The proxy system domain may be any domain wherein domain name requests against that domain ultimately resolve to the domain name server 180. The logic flow 600 may then proceed to block 652.

The logic flow 600 may transmit the redirect URL 325 to the client at block 652. The redirect URL 325 may be transmitted to the client as part of a redirect message 320, as an HTTP redirect for example. The logic flow 600 may then proceed to block 654.

The logic flow 600 may determine whether client verification is received from the domain name server 180 at block 654. Client verification may comprise an indication that the client has successfully transmitted verification of its identity, such as through the transmission of a secret 145 stored on the client, to the domain name server 180. This verification may have been received as part of a domain name request 170. If the proxy server 150 receives notification that the client has verified itself, the logic flow 600 may proceed to block 656. Otherwise, the logic flow 600 may proceed to block 670.

The logic flow 600 may add the network address to the list of authorized network addresses for the port at block 656. As the network address was included in the challenge sent to the client, the challenge included in the verification sent to the domain name server 180, the proxy server 150 may therefore open the network address as specified by the domain name server 180 without having to maintain a list of network addresses for which challenges are in the open. As, in some cases, a proxy server 150 may be subjected to repeated attempts by malicious clients attempting to gain unauthorized access, this may ease the load on the proxy server 150. Alternatively, in some embodiments the proxy server 150 may keep a list, such as a list off which things may expire after a preset amount of time (e.g., a few minutes), of network addresses with open challenges such that the domain name server 180 need not possess the capability of unpacking the challenge. Once the network address has been added to the list of authorized network addresses, the logic flow 600 may then end. The proxy server 150 may wait to receive a retransmission of request 110 from the client, wait for others requests from the client, and perform any other tasks asked of it in the functioning of network proxy system 100, such as handling communication from and to other clients.

The logic flow 600 may transmit a request denial 420 to the client at block 660. The denial may comprise an "HTTP bad request" message. The logic flow 600 may then proceed to block 662.

The logic flow 600 may determine whether client verification is received from the domain name server 180 at block 662. Client verification may comprise an indication that the client has successfully transmitted verification of its identity, such as through the transmission of a secret 145 stored on the client, to the domain name server 180. This verification may have been received as part of a domain name request 170. If the proxy server 150 receives notification that the client has verified itself, the logic flow 600 may proceed to block 664. Otherwise, the logic flow 600 may proceed to block 670.

The logic flow 600 may temporarily open the receiving port to any client at block 664. The receiving port may only be opened to request that cannot be redirected by the proxy server 150. The receiving port may be opened for a limited time, such as may be measured by a timer. The receiving port may be closed to non-authorized network addresses upon the first successful verification of a client network address for that port, even if the timer has not yet expired. Once the receiving port is temporarily opened to any client, the logic flow 600 may then end. The proxy server 150 may wait to receive a retransmission of request 110 from the client, wait for others requests from the client, and perform any other tasks asked of it in the functioning of network proxy system 100, such as handling communication from and to other clients.

The logic flow 600 may keep the receiving port closed to the received network address at block 670. This may not comprise an affirmative action by the proxy server 150 but instead an implicit consequence of failing to either add the network address to the list of authorized network addresses for the receiving port or temporarily open the receiving port to any client. Block 670 may therefore not represent a particular stage that the logic flow 600 will explicitly enter but instead represent the status quo until the client verification is received, if such client verification is ever received.

The embodiments are not limited to this example.

Figure 7:
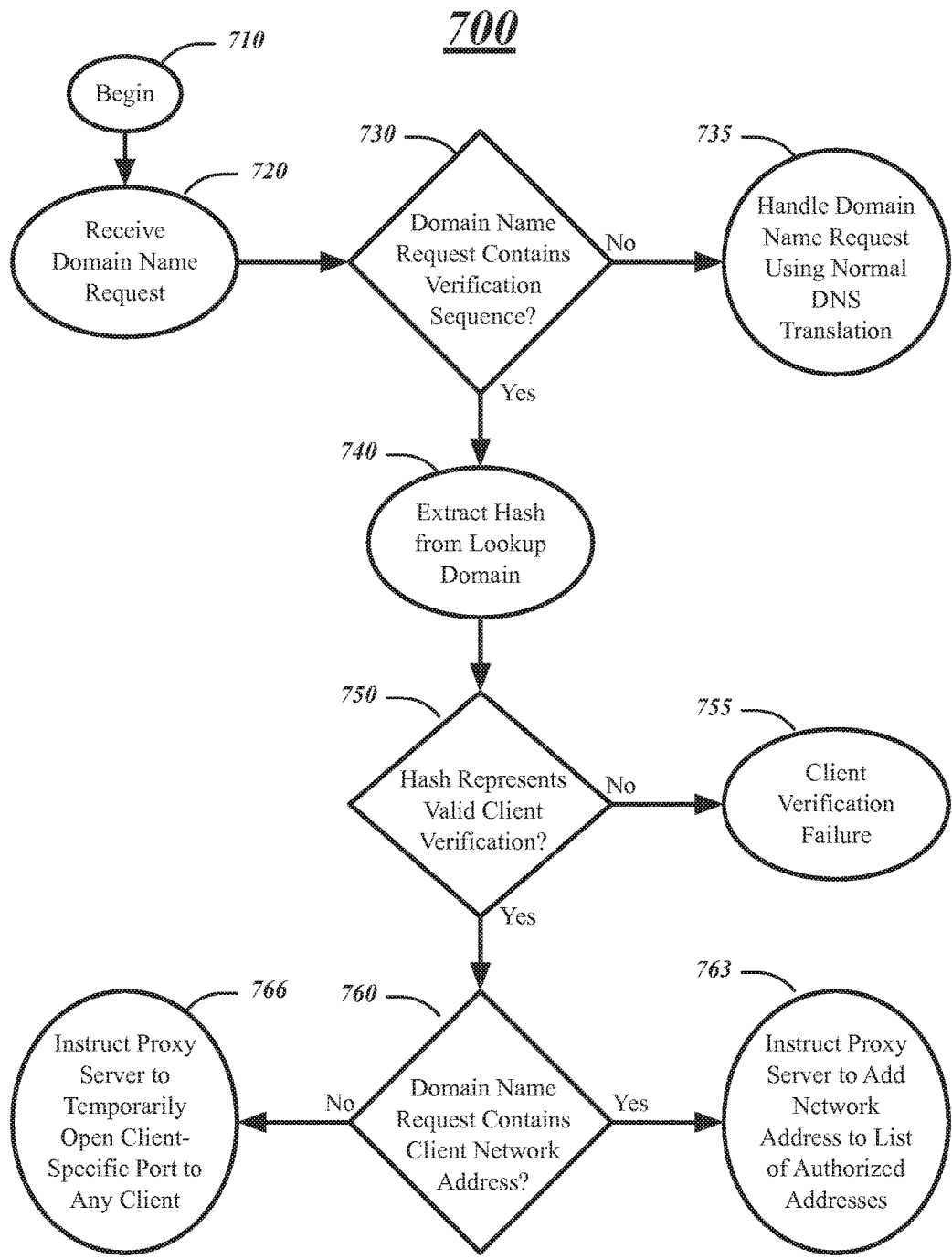
FIG. 7 illustrates a domain-name-server-side logic flow for the network proxy system of FIG. 1.

FIG. 7 illustrates one embodiment of a domain-name-server-side logic flow 700. The logic flow 700 may be representative of some or all of the operations executed by one or more embodiments described herein.

In the illustrated embodiment shown in FIG. 7, the logic flow 700 may begin at block 710. This may correspond to the domain name server 180 receiving an incoming connection on a network port. The logic flow 700 may then proceed to block 720.

The logic flow 700 may receive a domain name request at block 720. The logic flow 700 may then proceed to block 730

The logic flow 700 may determine whether the domain name request contains a verification sequence at block 730. That the domain name request contains a verification sequence may correspond to the domain name of the domain name request matching a format used for verification requests. That the domain name request contains a verification sequence may correspond to the domain name of the domain name request being for the domain of the network proxy system 100. In general, any of the described techniques for embedding a verification request within a domain name of a domain name request may be recognized by the domain name server 180. It will be appreciated that a verification sequence being present does not necessarily correspond to the verification sequence being valid. If the verification sequence is found, then the logic flow 700 may proceed to block 740. Otherwise, the logic flow 700 proceeds to block 735.

The logic flow 700 may handle the domain name request using normal DNS translation at block 735. This may comprise resolving the domain name request using a domain name directory, performing a recursive lookup on another domain name server, or any other technique for resolving a domain name request. The logic flow 700 may then end, which may correspond to the domain name server 180 waiting for new domain name requests.

The logic flow 700 may extract a hash 385 at block 740. This hash 385 may correspond to some or all of the verification sequence. The logic flow 700 may then proceed to block 750.

The logic flow 700 may determine whether the hash 385 represents a valid client verification at block 750. The domain name server 180 may compare the hash 385 to a hash received from the proxy server 150 to determine whether they match, such that matching hashes indicates that the client verification is valid. If the client verification is valid, then the logic flow 700 may proceed to block 760. Otherwise, the logic flow 700 may proceed to block 755.

The logic flow 700 may handle a client verification failure at block 755. In some embodiments, the domain name server 180 may notify the proxy server 150 or some other element of the network proxy system 100 that a client verification failure has occurred. In other embodiments, the domain name server 180 may simply decline from performing any client validation with the proxy server 150. The domain name server 180 may return a domain name response to the requesting computing, whether the client or an intermediary domain name server, so as to maintain the protocols of the domain name system. This domain name response may provide the network address for the proxy server 150. The logic flow 700 may then end, which may correspond to the domain name server 180 waiting for new domain name requests.

The logic flow 700 may determine whether the domain name request contains a client network address at block 760. The client network address may be stored in the open in the domain name request as part of the domain or as part of the hash. If the client network address is available, then the logic flow 700 continues to block 763. Otherwise, the logic flow 700 continues to block 766.

The logic flow 700 may instruct the proxy server 150 to add the network address to the list of authorized network addresses at block 763. This may comprise sending a client identification 185 to the proxy server 150, wherein the client identification 185 specifies the port the client is associated with and the network address to be added. The logic flow 700 may then end, which may correspond to the domain name server 180 waiting for new domain name requests.

The logic flow 700 may instruct the proxy server 150 to temporarily open the client-specific port to any client at block 766. This may comprise sending a client identification 185 to the proxy server 150, wherein the client identification 185 specifies the port the client is associated with. The client-specific port and the proxy server 150 may have been specified in the received domain name request. The logic flow 700 may then end, which may correspond to the domain name server 180 waiting for new domain name requests.

The embodiments are not limited to this example.

Figure 8:
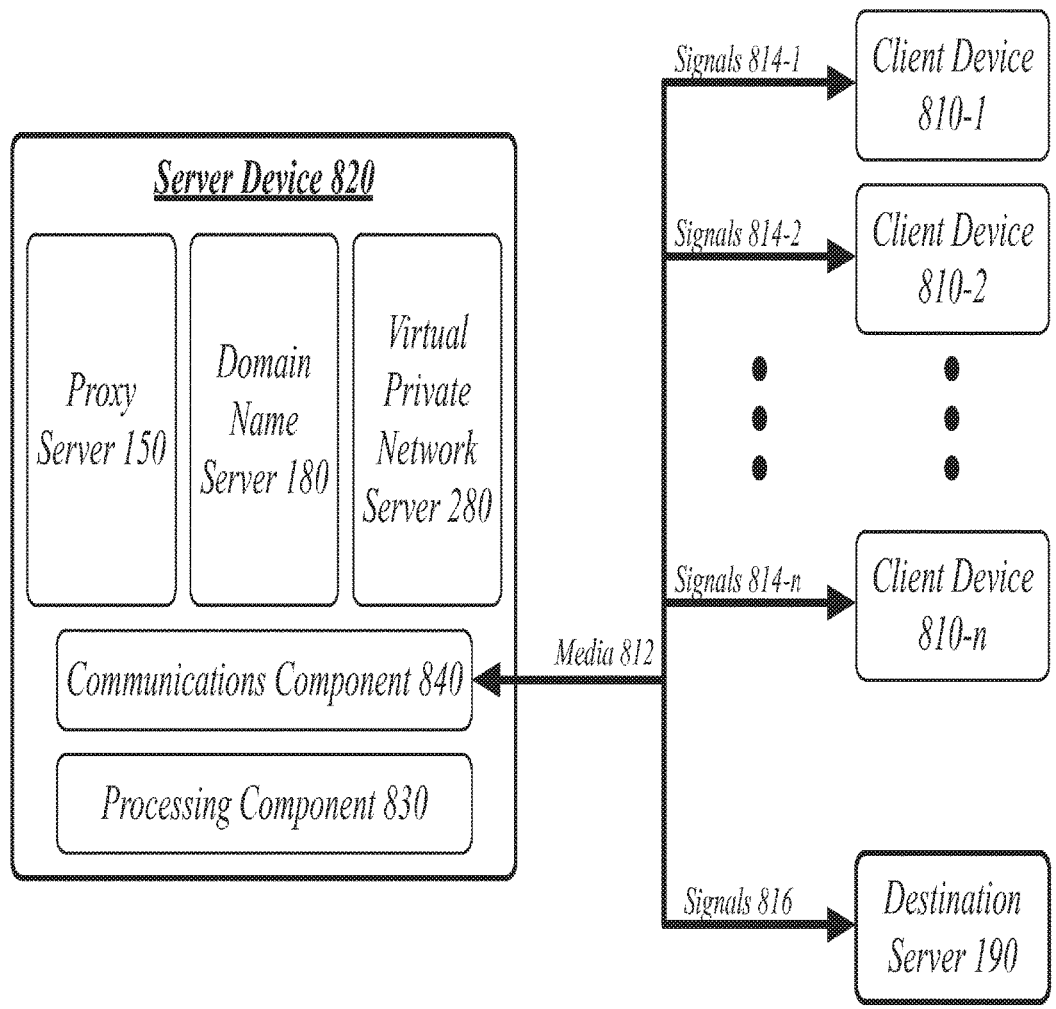
FIG. 8 illustrates an embodiment of a centralized system for the network proxy system of FIG. 1.

FIG. 8 illustrates a block diagram of a centralized system 800. The centralized system 800 may implement some or all of the structure and/or operations for the network proxy system 100 in a single computing entity, such as entirely within a single server device 820.

The server device 820 may comprise any electronic device capable of receiving, processing, and sending information for the network proxy system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The server device 820 may execute processing operations or logic for the network proxy system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The server device 820 may execute communications operations or logic for the network proxy system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The server device 820 may communicate with client devices 810-a over communications media 812 using communications signals 814-b, 816 via the communications component 840. The client devices 810-a may be various clients of the network proxy system 100, such as client device 120. The signals 814-b sent over media 812 may correspond to the transmission of any and all of request 110, response 115, earlier request 310, redirect message 320, request denial 420, and domain name request 170 to and from the client device 120 and the server systems of the network proxy system 100. The signals 816 sent over media 812 may correspond to the transmission of request 110, and other requests by other clients, to the destination server 190, and other possible destination servers, and the transmission of response 115, and other responses, back to the server device 820.

Figure 9:
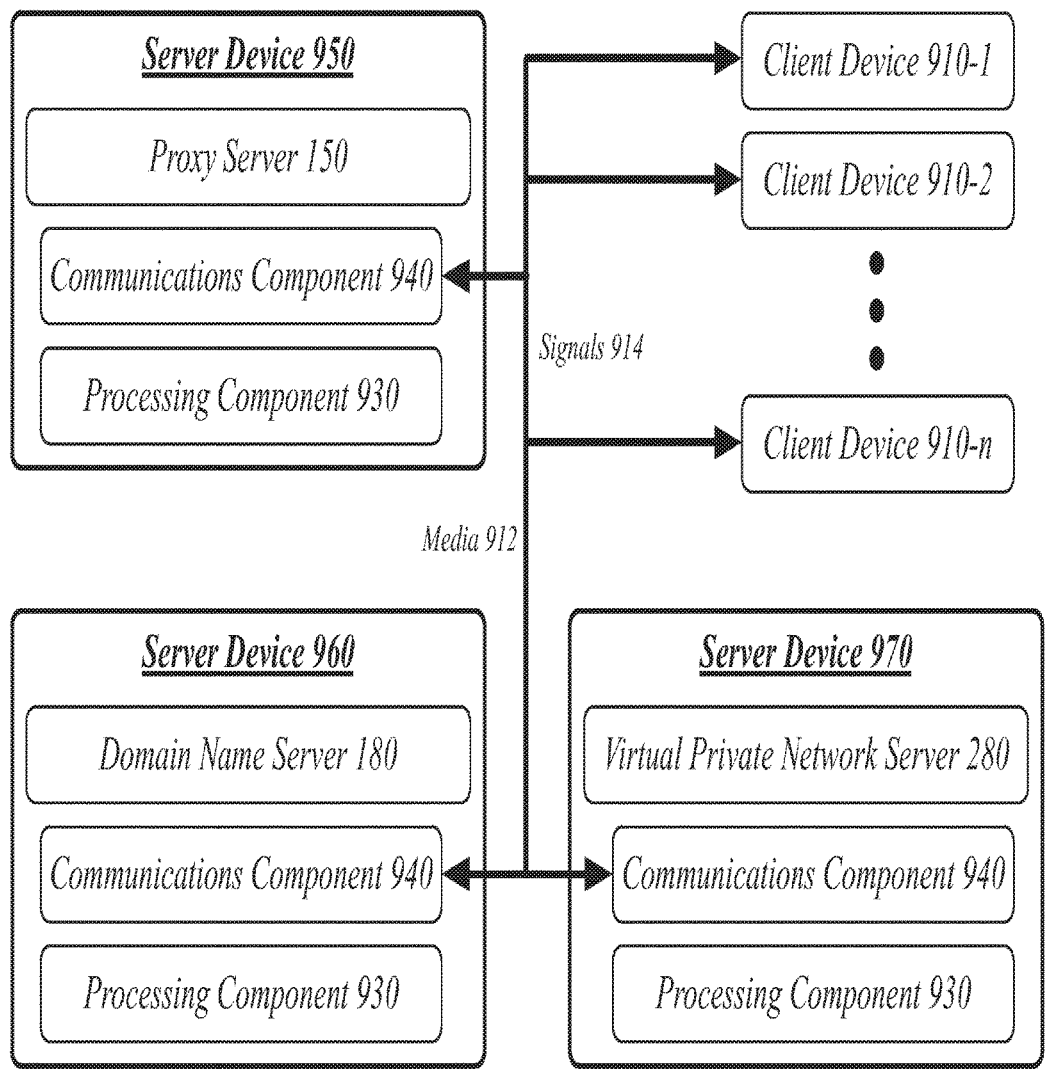
FIG. 9 illustrates an embodiment of a distributed system for the network proxy system of FIG. 1.

FIG. 9 illustrates a block diagram of a distributed system 900. The distributed system 900 may distribute portions of the structure and/or operations for the network proxy system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of client devices 910-c and server devices 950, 960, and 970. In general, the client devices 910-c and the server device server devices 950, 960, and 970 may be the same or similar to the server device 820 as described with reference to FIG. 8. For instance, the server devices 950, 960, and 970 may each comprise a processing component 930 and a communications component 940 which are the same or similar to the processing component 830 and the communications component 840, respectively, as described with reference to FIG. 8. In another example, the devices 910-c, 950, 960, and 970 may communicate over a communications media 912 using communications signals 914 via the communications components 940.

The client devices 910-c may comprise or employ one or more client programs that operate to perform various methodologies in accordance with the described embodiments. For example, the client devices 910-c may implement data stores storing network configuration files as described for data store 130 and network configuration file 140 of client device 120.

The server device 950 may comprise or employ one or more server programs that operate to perform various methodologies in accordance with the described embodiments. Server device 950 may implement the proxy server 150. Server device 960 may implement the domain name server 180. Server device 970 may implement the virtual private network server 280. It will be appreciated that additional proxy servers, additional domain name servers, and additional virtual private network servers may be included in the distributed system 900 for the network proxy system 100. Signals 914 sent over media 912 may correspond to the transmission of any and all of request 110, response 115, earlier request 310, redirect message 320, request denial 420, domain name request 170, client identification 185, to and from the client device 120 and the server devices 950, 960, and 970 of the network proxy system 100. Similar requests and responses may be performed with any of the client devices 910-c.

Figure 10:
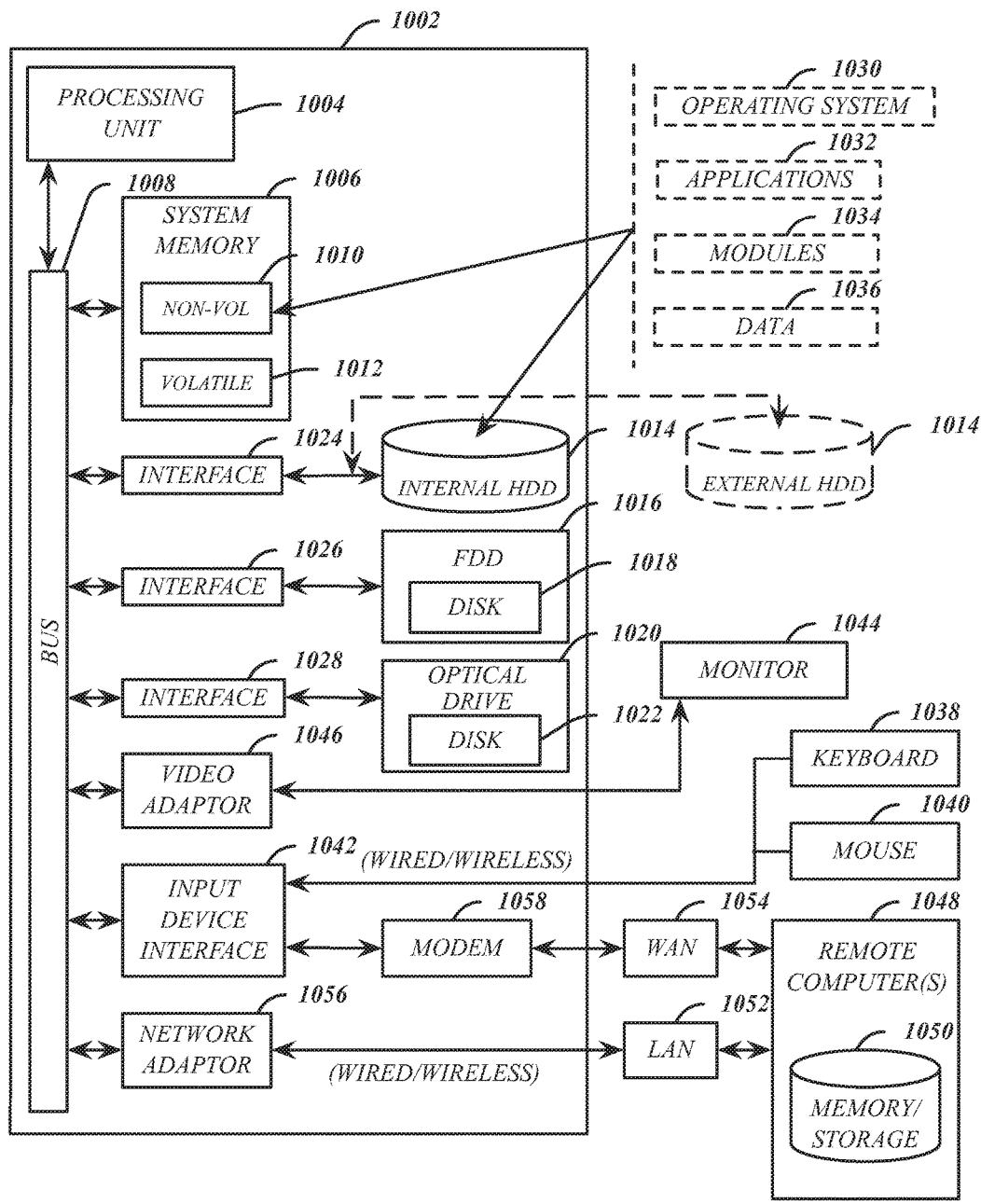
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the network proxy system 100.

A user can enter commands and information into the computer 1002 through one or more wire/wireless input devices, for example, a keyboard 1038 and a pointing device, such as a mouse 1040. Other input devices may include microphones, infrared (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
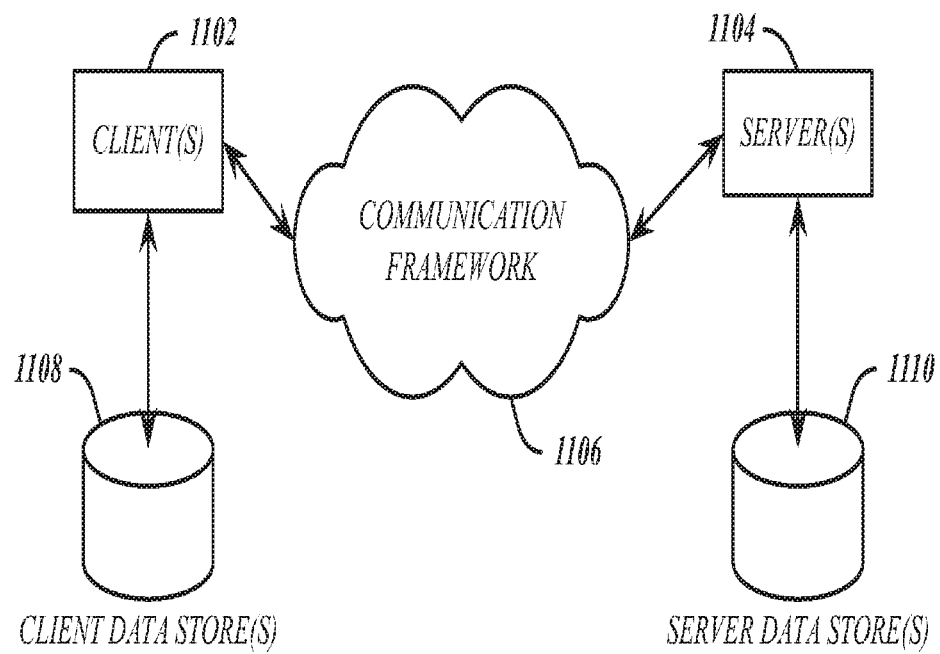
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server device 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a domain name request from a client, the domain name request including a verification sequence comprising an encoding of a client-specific secret embedded within a lookup domain of the domain name request;
determining that the verification sequence indicates that the client has access rights to a proxy server; and
notifying the proxy server that the client device has access rights to the proxy server.

2. The method of claim 1, further comprising determining that at least a portion of the domain name request corresponds to the verification sequence in the form of a client-specific secret embedded in a lookup domain of the domain name request.

3. The method of claim 1, wherein the determining comprises decrypting at least a portion of the verification sequence and verifying that the decrypted portion contains a client-specific secret.

4. The method of claim 1, wherein the determining comprises matching the verification sequence to an expected verification sequence received from the proxy server.

5. The method of claim 1, wherein the verification sequence comprises a client-specific secret, and a domain name server that performs the determining does not directly store the client-specific secret.

6. The method of claim 1, wherein the verification sequence comprises a client-specific secret, and further comprising receiving a hashing of a concatenation of a challenge associated with the proxy server and the client-specific secret.

7. The method of claim 1, further comprising receiving a broadcast of an expected lookup domain associated with the client, wherein the determining comprises matching a lookup domain of the domain name request to the expected lookup domain.

8. A non-transitory computer-readable medium storing: instructions configured to cause one or more processors, and a memory to receive a domain name request from a client, the domain name request including a verification sequence comprising an encoding of a client-specific secret embedded within a lookup domain of the domain name request; instructions configured to cause the one or more processors to determine that the verification sequence indicates that the client has access rights to a proxy server; and instructions configured to cause the one or more processors to notify the proxy server that the client device has access rights to the proxy server.

9. The medium of claim 8, further storing instructions configured to cause the one or more processors to determine that at least a portion of the domain name request corresponds to the verification sequence in the form of a client-specific secret embedded in a lookup domain of the domain name request.

10. The medium of claim 8, wherein the determining comprises decrypting at least a portion of the verification sequence and verifying that the decrypted portion contains a client-specific secret.

11. The medium of claim 8, wherein the determining comprises matching the verification sequence to an expected verification sequence received from the proxy server.

12. The medium of claim 8, wherein the verification sequence comprises a client-specific secret, and a domain name server that performs the determining does not directly store the client-specific secret.

13. The medium of claim 8, wherein the verification sequence comprises a client-specific secret, and further storing instructions configured to cause the one or more processors to receive a hashing of a concatenation of a challenge associated with the proxy server and the client-specific secret.

14. The medium of claim 8, further storing instructions configured to cause the one or more processors to receive a broadcast of an expected lookup domain associated with the client, wherein the determining comprises matching a lookup domain of the domain name request to the expected lookup domain.

15. An apparatus comprising: a network access component configured to receive a domain name request from a client, the domain name request including a verification sequence comprising and encoding of a client-specific secret embedded within a lookup domain of the domain name request; and one or more processors and a memory configured to determine that the verification sequence indicates that the client has access rights to a proxy server, the network access component further configured to notify the proxy server that the client device has access rights to the proxy server.

16. The apparatus of claim 15, the one or more processors further configured to determine that at least a portion of the domain name request corresponds to the verification sequence in the form of a client-specific secret embedded in a lookup domain of the domain name request.

17. The apparatus of claim 15, wherein the determining comprises at least one of decrypting at least a portion of the verification sequence and verifying that the decrypted portion contains a client-specific secret, or matching the verification sequence to an expected verification sequence received from the proxy server.

18. The apparatus of claim 15, wherein the verification sequence comprises a client-specific secret, and the apparatus does not directly store the client-specific secret.

19. The apparatus of claim 15, wherein the verification sequence comprises a client-specific secret, and the network access component is further configured to receive a hashing of a concatenation of a challenge associated with the proxy server and the client-specific secret.

20. The apparatus of claim 15, the network access component further configured to receive a broadcast of an expected lookup domain associated with the client, wherein the determining comprises matching a lookup domain of the domain name request to the expected lookup domain.

* * * * *

UNITED STATES PATENT AND TRADEMARK OFFICE
CERTIFICATE OF CORRECTION

PATENT NO. : 9,985,968 B2
APPLICATION NO. : 15/427747
DATED : May 29, 2018
INVENTOR(S) : Lior Tubi et al.

It is certified that error appears in the above-identified patent and that said Letters Patent is hereby corrected as shown below:

Column 25, Line 33, replace "and encoding" with -- an encoding --.

Signed and Sealed this
Eighteenth Day of September, 2018

Andrei Iancu
*Director of the United States Patent and Trademark Office*